Patented June 10, 1941

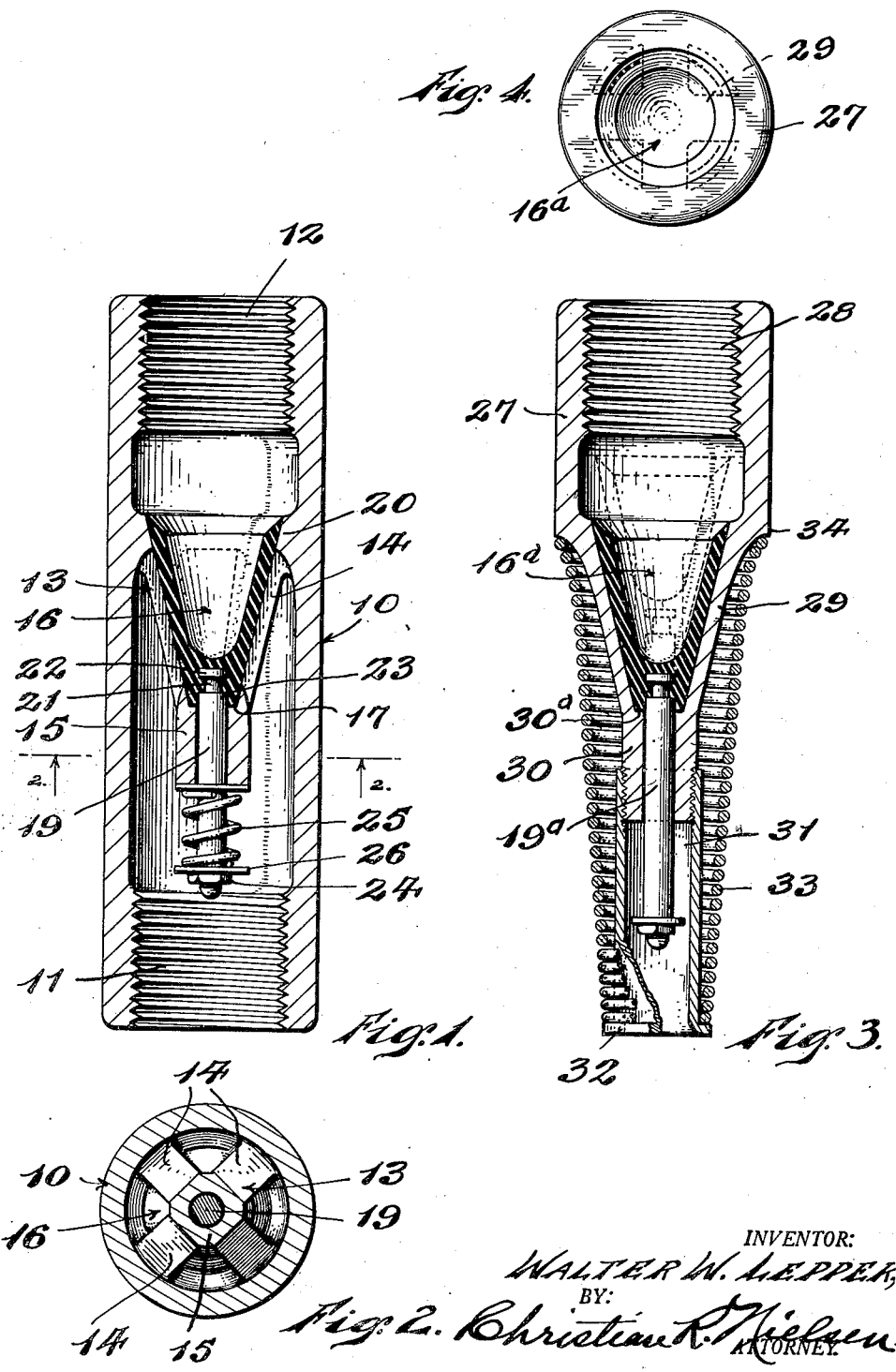

2,244,997

UNITED STATES PATENT OFFICE 2,244,997

VALVE CONSTRUCTION

Walter W. Lepper, Fort Wayne, Ind., assignor of one-third to Vernon L. Tannehill and one-third to Starley M. White, both of Fort Wayne, Ind.

Application August 11, 1939, Serial No. 289,658

1 Claim. (Cl. 251—144)

This invention relates to valves and more particularly to a type embodying the combined principles of the poppet and diaphragm valve, and it consists in the constructions, arrangements and combinations herein described and claimed.

It is a particular object of the invention to provide a valve per se of a flexible character permitting a straight flow of liquid, without restriction.

It is also an object of the invention to provide a valve constructed of a very soft, but tough rubber which will seat itself upon its seat and effect a positive closure, even though the valve seat may be pitted or otherwise imperfect.

It is a still further object of the invention to provide a valve and cage therefor, in which the valve and seat is of conical formation, the valve being an inverted hollow cone-like structure, the side walls of which readily adapt themselves to the cage due to their inherent elasticity, and this under but slight pressure.

It is a still further object of the invention to provide a valve in which the soft resilient side walls of the valve may flex prior to actual movement of the valve, thereby providing a valve which will open at the slightest suction, eliminating the loss of head, which is the case where spring-seated valves are involved, and this in conjunction with the general construction of valve and cage makes the assembly noiseless.

Additional objects, advantages and features of invention will appear from the following description considered in conjunction with the accompanying drawing, wherein Figure 1 is a sectional view of a cage valve constructed in accordance with my invention, illustrating its use as a check valve.

Figure 2 is a cross section on the line 2—2 of Figure 1.

Figure 3 is a view similar to Figure 1, illustrating the use of the valve as a foot valve.

Figure 4 is a top plan view thereof.

Attention is first invited to Figures 1 and 2 illustrating the valve in use as a check valve. In this instance the cage is represented by the reference character 10, which as shown is in the form of a coupling having interiorly threaded ends 11 and 12 whereby the cage may be installed in a pipe line as desired.

Intermediate the length of the coupling 10 there is provided a conical valve seat 13, which in the present instance comprises four downwardly extended legs 14 sloping inwardly toward the longitudinal axis of the coupling and terminating in a sleeve 15 for guidance of a valve generally indicated at 16.

The legs 14 are formed as an integral part of the coupling in the present instance, although they may be otherwise formed, as found practical, and at their juncture with the sleeve 15 a seat 17 is formed. As clearly shown in Figure 2, the legs are equally spaced providing ample clearance for passage of liquids when the valve is unseated.

The sleeve 15 has a longitudinal bore for reception of the stem 19 of the valve 16.

The valve 16 is formed of soft, tough, resilient rubber, and is shaped as an inverted open-ended cone, the legs 14 being conically arranged and shaped for snug fit with the outer wall of the valve. Preferably, however, the wall of the valve is greater in length than the legs so as to seat at its upper end upon an annular inwardly projected shoulder 20 of the coupling. It should be noted that the coupling 10 above the shoulder 20 is of such diameter that free and unrestricted flow of liquid is made possible.

The stem 19 may be incorporated in the apex of the valve in any approved and practical manner, and in the present instance, I have shown the stem 19 as having a reduced portion 21 defining a head 22 and shoulder 23. The reduced portion thus affords anchorage means for rubber of the valve, and may be molded or otherwise integrally connected.

The stem 19 projects a substantial distance below the sleeve 15 and has fixed on the end thereof a nut 24, the latter confining a helical spring 25 the ends of which contact respective bearing washers 26. The spring effectively holds the valve to its seat. In some instances the spring 25 may be omitted, the valve then seating by gravity.

In Figure 3, I have illustrated the valve in use as a foot valve, and in this instance a fitting 27 is employed, having a threaded end 28 for reception of a pipe line (not shown). The other end of the fitting is extended in the form of four circumferentially spaced leg members 29. The leg members slope inwardly in the direction of the longitudinal axis of the fitting and meet at such axis in the form of a sleeve 30, having an annular set 30—a.

The lower end of the sleeve 30 is exteriorly threaded to receive a pipe section 31. The section 31 has an outwardly turned annular shoulder 32, forming a set for the lower end of a helical spring 33, the upper end of the spring seating against a shoulder 34 of the fitting. The spring is preferably tapered in the direction of the shoulder 32.

The valve 16—a and its associated stem 19—a are constructed as previously described, but in this instance, the spring 25 is omitted and the valve therefore is gravity seated.

The spring 33 functions to prevent passage of large particles to the valve and since there is continual vibration of the helices of the spring, due to passage of water therethrough, a self-cleaning action is inherent, without liability of clogging, as is the case with perforated metal screens. Also it will be apparent that by adjustment of the pipe section 31 with respect to the sleeve 30, the spacing of the helices of the spring may be varied, that is to say, the space between the helices may be increased or decreased, as found necessary.

From the foregoing, it will be apparent that by the provision of a long tapered valve seat and a long tapered valve embodying a resilient flexible wall, the edges of the wall of the valve may readily flex to permit a straight flow of liquid as well as permitting a large port area.

Actual tests have shown that the valve will hold tight to its seat even though the seat may not be in perfect condition, and under slight pressure; and this notwithstanding that the valve may be partly unseated due to particles of grit or the like. It has also been found that the wall of the valve will flex prior to actual unseating of the valve, under slight suction or pressure, so that liability of loss of head is eliminated, which is of particular importance in small suction pumps, where the loss of head on account of an improper foot valve would offer a serious problem and loss of time.

While I have shown and described specifically preferred forms of the valve, this is by way of illustration only, and I consider as my own all such modifications in structure as fairly fall within the scope of the appended claim.

I claim:

In combination, a valve cage having means for connection in a pipe line, a plurality of circumferentially spaced elongated arms upon the interior of the cage sloping in the direction of the longitudinal axis of the cage and terminating in a seat axially of the cage, an elongated conical valve complemental to the seat, said seat having an axial bore and an extension, the valve having a stem slidably mounted in the bore, means on the stem for holding the valve within the bore, a helical spring on the stem interposed between the holding means and the extension of the seat, and said valve having an open end and elastic flexible walls movable axially toward the open end thereof under action of pressure in the direction of the stem, whereby to permit a straight flow of liquid between said arms and through the cage.

WALTER W. LEPPER.